United States Patent [19]

Hickey

[11] 4,190,182
[45] Feb. 26, 1980

[54] SKI CARRIER

[75] Inventor: Dana Hickey, Merrimack, N.H.

[73] Assignee: Ski Tree, Inc., Nashua, N.H.

[21] Appl. No.: 878,798

[22] Filed: Feb. 17, 1978

[51] Int. Cl.² ............................................. A45F 5/10
[52] U.S. Cl. .................................... 224/45 S; 224/917
[58] Field of Search ............... 224/5 Z, 45 R, 45 F, 224/45 M, 45 N, 45 P, 45 Q, 45 S, 917; 24/81 SK; 280/11.37 A, 11.37 K; 211/60 SK; 70/58

[56] References Cited

U.S. PATENT DOCUMENTS

| | | |
|---|---|---|
| 68,399 | 9/1867 | Wadsworth .................... 224/45 F |
| 1,098,797 | 6/1914 | Hehr .......................... 224/45 F X |
| 2,907,507 | 10/1959 | Solak . |
| 3,248,027 | 4/1966 | Pfleider . |
| 3,259,284 | 7/1966 | Olson . |
| 3,260,430 | 7/1966 | Sandenburgh . |
| 3,272,413 | 9/1966 | Pfleider . |
| 3,307,759 | 3/1967 | Fulton . |
| 3,370,766 | 2/1968 | Woolworth . |
| 3,399,750 | 9/1968 | Woolworth . |
| 3,558,024 | 1/1971 | Walsh . |
| 3,626,553 | 12/1971 | Darney et al. ........... 280/11.37 A X |
| 3,718,242 | 2/1973 | Larson . |
| 3,877,623 | 4/1975 | Breault ....................... 224/45 S |
| 3,893,606 | 7/1975 | Hofmann .................. 224/45 S X |
| 3,985,275 | 10/1976 | Allen ..................... 280/11.37 K X |
| 4,059,209 | 11/1977 | Grisel ................... 280/11.37 K X |

*Primary Examiner*—Stephen G. Kunin
*Assistant Examiner*—Winston H. Douglas
*Attorney, Agent, or Firm*—Kenway & Jenney

[57] ABSTRACT

A hand carrier for skis and ski poles has a handle and a pair of panels hinged at their upper edges to the handle. Each panel is generally U-shaped in cross section with inner and outer walls and a bottom wall that together define a ski-receiving channel. Skis held in the channels rest on the bottom walls and deflect the outer wall laterally. Because the panels are each formed in one piece of a resilient material, the deflection develops a spring force that grips the skis between the inner and outer walls. A single hinge pin connects the panels to the handle and allows movement of the panels from a downwardly hanging position during carrying to a horizontal co-planar position for mounting the skis on one type of car ski rack. A pair of clip-type holders secured on opposite sides of the handle above the panels releasably engage the ski poles.

7 Claims, 4 Drawing Figures

SKI CARRIER

BACKGROUND OF THE INVENTION

This invention relates in general to hand-held carrier devices. More specifically, it relates to a compact carrier for a pair of skis and ski poles that secures the skis in panels hinged to a handle.

Skis and ski poles are difficult to transport by hand because there are several separate items to be carried and each item is relatively cumbersome and awkward to handle. Various hand carriers for skis are known in the art. One solution is to provide rigid brackets on a frame of a boot carrier as described in U.S. Pat. Nos. 3,272,413 and 3,248,027 to Pfeider. These carriers, however, do not fix the skis in the brackets, the carrier itself is cumbersome, and the skis must be removed from the carrier to mount them on a car ski rack. Further, there is no provision for securing the ski poles. U.S. Pat. No. 3,259,284 to Olson describes a less cumbersome carrier where ski boots are suspended from the ends of a flexible strap carried on a shoulder. The skis are carried by cradling them in a bracket secured in the strap over the shoulder. Pole straps are hooped around the bracket. Again, neither the skis nor the poles are secured and they must be disengaged from the carrier to mount them in a car rack.

U.S. Pat. Nos. 3,558,024 to Walsh and 3,260,430 to Sandenburgh disclose carriers that clamp the skis on a pair of parallel, spaced bars or hangers oriented transversely to the skis. In the Walsh device wing nuts tighten clamping plates that engage the edges of the skis against the bars. A cord linking the bars serves as a handle. In the Sandenburgh device, C-shaped hangers secure the skis in the lower corner and the poles in the upper corner with a flexible strap clamped to the hangers between the skis and the poles and terminated at both ends in release levers. The poles themselves serve as a carrying handle. While these devices are relatively compact and lightweight compared to the boot carriers, they also have drawbacks. The Walsh device, for example, does not carry the ski poles and accommodates for skis of varying width by gripping only one edge of one of the skis. The equipment is gripped more securely in the Sandenburgh carrier, and skis of varying dimensions are accommodated, but the assembled equipment is not readily mounted on a car rack. Also, positioning the pair of bars or hangers and securing the ski equipment to the bars is inconvenient.

U.S. Pat. Nos. 3,307,759 to Fulton and 3,718,242 to Larson describe more compact carriers for both skis and poles. The Fulton carrier is a combination carrier and locking device. The skis are held in rigid up-turned flanges. Movement of a handle clamps the skis and the ski poles. The Fulton carrier slings the skis in a pair of resilient straps that each extend from the lower edge of a panel to a clasp at the upper end of the panel. The panels pivot on separate, parallel pins mounted in a handle. The ski poles are also carried in the straps under the skis. Both of these carriers, however, are relatively costly to manufacture. Also, they do not adapt well to skis of varying cross-sectional dimensions.

It is therefore a principal object of this invention to provide a hand carrier for skis and ski poles that reliably and conveniently secures the ski and poles and accepts skis of varying cross-sectional dimensions without adjustment.

Another object is to provide a ski carrier that allows the skis and poles to be mounted on any standard car ski rack.

A further object of this invention is to provide a ski carrier that is compact, lightweight and durable.

Still another object is to provide a ski carrier with the foregoing advantages that has a comparatively low cost of manufacture.

SUMMARY OF THE INVENTION

A ski carrier is formed of a handle piece and a pair of panel pieces secured below the handle. Each panel carries a ski in a generally U-shaped channel defined by the outward facing surface of an inner wall, and outer wall, and a bottom wall extending laterally between the lower end of the inner and outer walls. The outer wall extends generally upwardly and is inclined towards the inner wall. The outer wall joins the bottom wall in a curved wall section. The walls are formed integrally of a resilient material with an inherent tendency to assume a preselected unstressed position. When a ski is loaded in one of the panels, the outer wall is displaced laterally from a relaxed position adjacent the inner wall. The "memory" of the panel material develops a spring force that grips the ski between an upper portion of the outer wall panel and the inner wall. The bottom wall is wide enough to accept a variety of ski thicknesses. The radius of curvature and the inclination of the outer panel are designed to generate a relatively high gripping force for varying ski thicknesses, preferably at least five pounds per square foot. The outer wall preferably includes a cam surface located at its upper edge and inclined away from the inner wall to facilitate insertion of the skis.

In one form the handle and panels each have hinge members formed on their adjoining edges that intermesh in axial alignment to receive a common hinge pin. In a carrying position, the panels are in a parallel, back-to-back relationship with the ski receiving channels facing upwardly. The panels also pivot about the hinge pin through a right angle to place the panels in a horizontal co-planar relationship suitable for mounting the skis in one standard type of car ski rack without removing the carrier from the skis. The carrying position is adapted to mounting the skis in a second standard car ski rack, also without removing the carrier.

The carrier handle includes a pair of clips mounted below a hand opening. The clips secure a pair of ski poles and are preferably formed integrally with the handle of a resilient material. The handle and panels are preferably formed of an elastomeric plastic such as high impact ABS.

These and other features and objects of this invention will be more fully understood from the following detailed description which should be read in light of the accompanying drawings.

DETAILED DESCRIPTION OF THE PREFERRED EMBODIMENTS

Figures 1, 2:
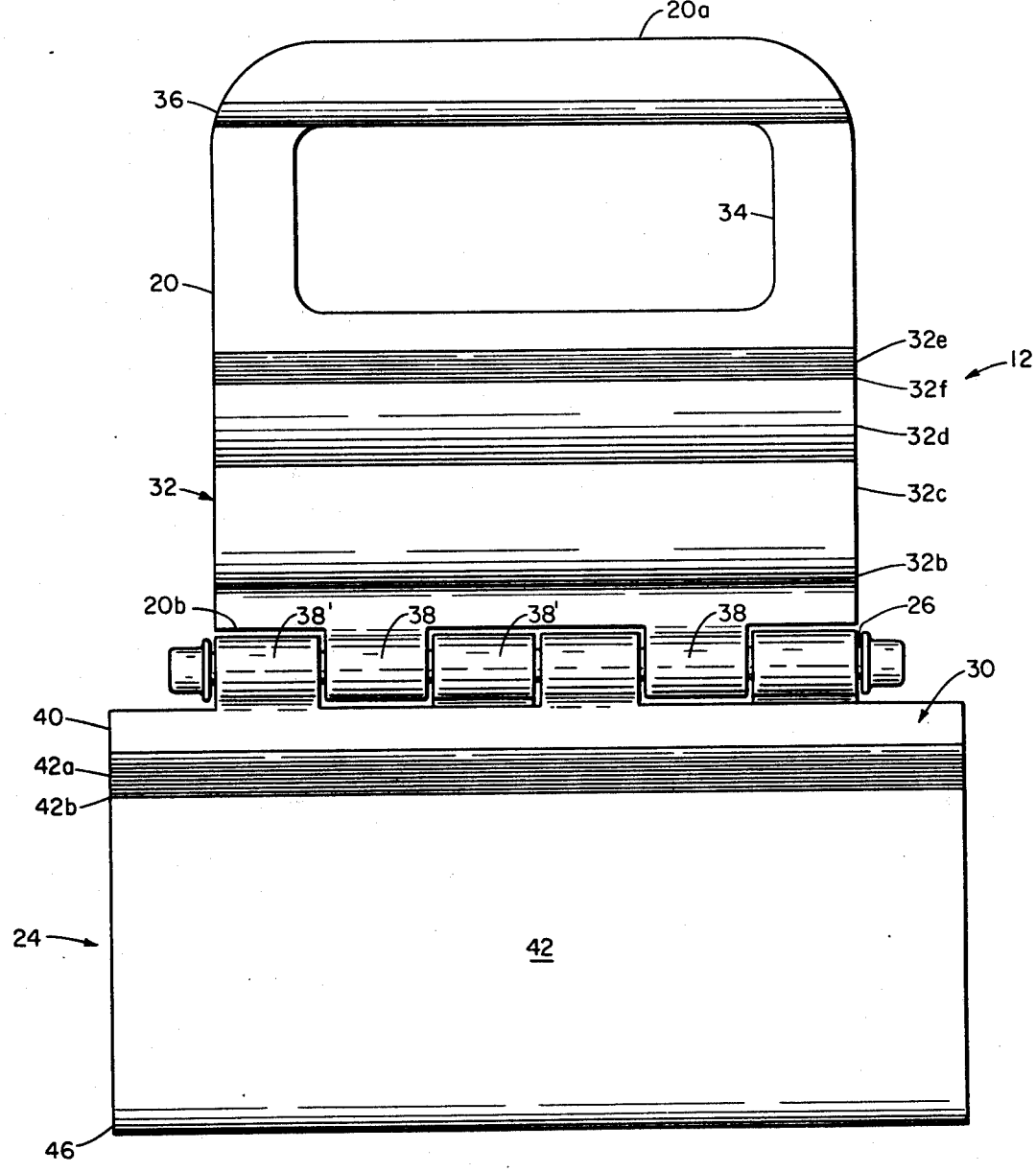
FIG. 1 is a view in side elevation of a ski carrier according to this invention carrying a pair of skis and ski poles.
FIG. 2 is a perspective view of the carrier shown in FIG. 1 without the skis or poles.
Figure 3:
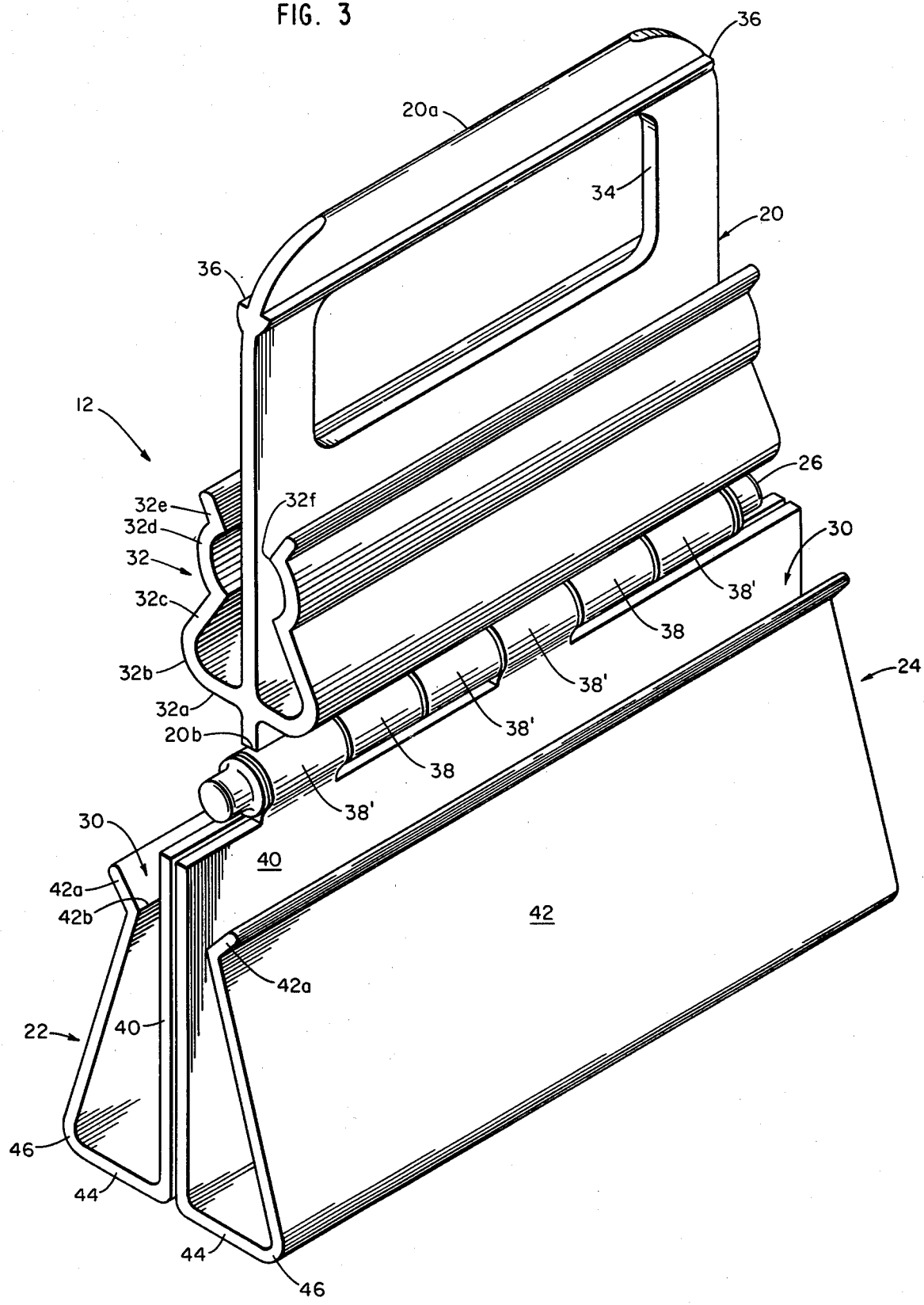
FIG. 3 is a view in side elevation of the carrier shown in FIG. 2.
Figure 4:
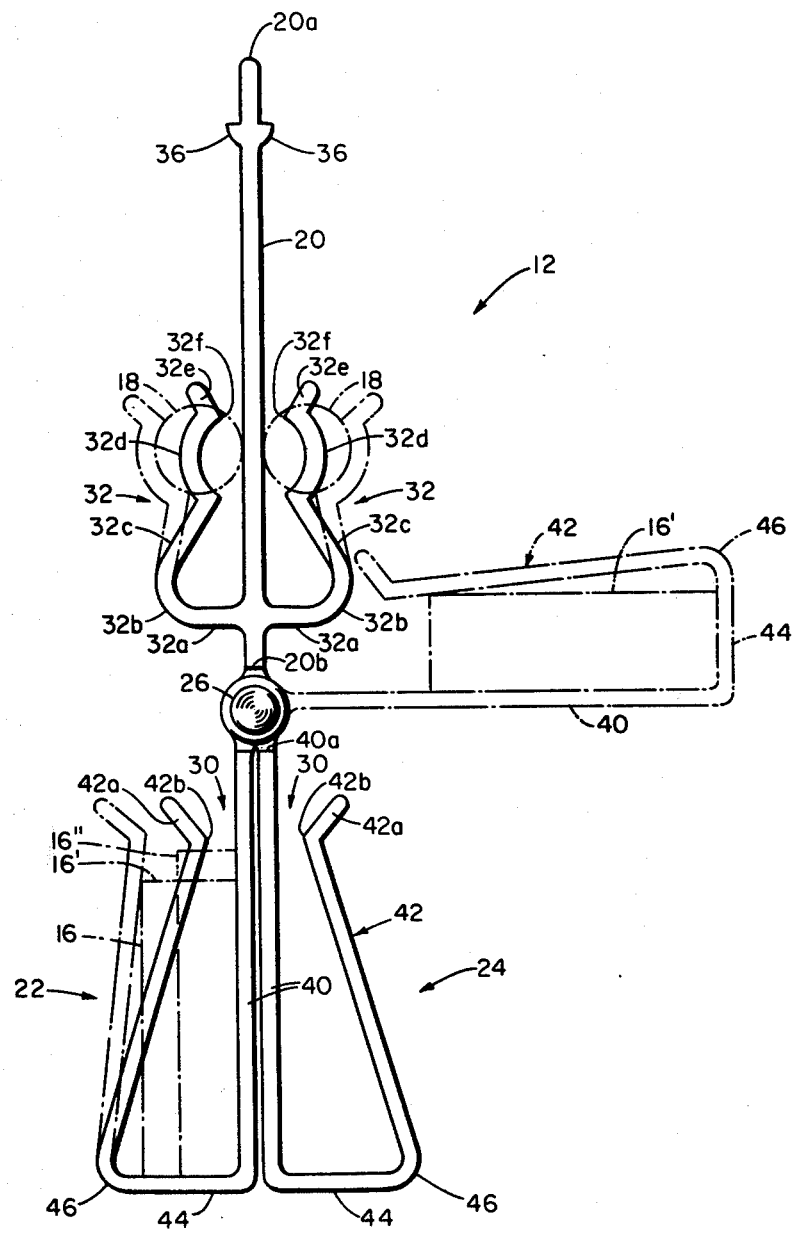
FIG. 4 is a view in end elevation of the carrier shown in FIG. 3 with the ski engaging positions of the panels and pole clips shown in phantom and a pivoted position of the panels suitable for mounting the skis in a car ski rack also shown in phantom.

FIG. 1 shows a ski carrier 12 according to the invention held by a hand 14 and carrying a pair of skis 16, 16 and ski poles 18, 18. The carrier includes a handle 20 and panels 22 and 24 that each hold and grip one of the skis 16, 16. A hinge pin 26 threads axially aligned and intermeshed hinges formed on the handle and both panels to pivotally connect them. When carried, the skis each extend generally horizontally in the direction of the arrow 28 and are carried tip-to-tip with their bottom surfaces facing one another, as shown. The skis are each seated in a ski-receiving channel 30 (FIGS. 2–4) of the panels 22, 24 approximately midway along their lengths to balance their weight about the handle. Clips 32, 32 secured on opposite faces of the handle 20 releasably secure the ski poles 18, 18. The poles are generally parallel with one another and also aligned in the direction of the arrow 28. The poles are oriented in opposite directions.

With reference to FIGS. 1–4 the handle 20 is a generally rectangular piece of a structural material such as plastic with a hand opening 34 formed below its upper edge 20a. The opening is generally rectangular and extends horizontally in the direction of the arrow 28. Its dimensions are selected to accommodate a large gloved hand. A pair of flanges 36 with rounded bottom surfaces extend along the upper edge of the opening 34 to distribute the weight of the skis, poles and carrier over a larger area. The lower edge 20b of the handle 20 is generally parallel to the upper edge 20a and carries a pair of hinges 38, 38. The hinges 38, 38 are spaced axially from one another by a distance equal to slightly more than their combined length. The hinges 38, 38 each have a central axial opening that is axially aligned with one another and adapted to receive the hinge pin 26. It should be noted that the center of each hinge 38 is also on the vertical centerline of the handle.

The ski pole clips 32, 32 are secured on the handle between the opening 34 and the hinges 38. In the preferred form, the handle 20 (including the hinges 38, 38) and the clips 32, 32 are formed integrally as by molding a thermosetting elastomeric plastic material such as a high impact acrylonitrile-butadiene-styrene copolymer. As noted in a standard text, *The Condensed Chemical Dictionary* p. 1, Van Nostrand Reinhold Co. (9th Ed.), such acrylonitrile-butadiene-styrene copolymers are commonly abbreviated as "ABS". The elastomeric property of ABS is particularly useful in forming the clips 32. In the illustrated preferred form, each clip has a leg 32a that projects laterally from the handle. A curved portion 32b links the leg 32a to an upwardly extending and inwardly inclined leg 32c which in turn supports a curved wall portion 32d that conforms to and engages the ski pole. A cam portion 32e extends upwardly and outwardly from the upper edge or corner 32f of the curved portion 32d.

As a ski pole is inserted downwardly into the clip 32, it engages the cam portion 32e which deflects the clip portions 32c, 32d and 32e laterally away from the handle. Once the pole clears the corner 32f it automatically seats under the curved portion 32d as shown in phantom in FIG. 4. Because the ABS is elastomeric, it has a "memory" characteristic, that is, an inherent tendency to return to its molded, undeflected position. In the deflected, pole-engaging position, the clip portions 32a, 32b and 32c develop a spring force that grips the pole between the clip portion 32d and the main body of the handle.

The panels 22, 24, which are identical in construction, each have an inner wall 40, an outer wall 42 and a transverse bottom wall 44 that spans the walls 40 and 42. The inner wall 40 has a generally rectangular configuration. Its upper edge 40a extends generally in the direction of the arrow 28 and carries a pair of hinges 38' 38'. The inner walls 40, 40 lie to one side of the handle centerline and are slightly spaced from the centerline. As a result, when the panels 22, 24 hang in the carrying position, their inner walls are in contact with one another. It should be noted that the thickness of the inner walls 40, 40 accommodates the camber of the skis 16, 16. It should also be noted that while the panels 22 and 24 are identical, when assembled on the handle they are oppositely oriented.

The bottom wall 44 extends generally at a right angle to the inner wall 40 and for a sufficient distance to support the thickest conventional ski. The outer wall 42 extends generally upwardly and inwardly toward the inner wall. At its upper end, the outer wall 42 has an outwardly inclined cam portion 42a that defines an inner edge or corner 42b. The vertical height of the outer wall 42 is sufficient for the corner 42b to extend above the ski 16 loaded in the channel 30 defined by the walls 40, 42 and 44.

The panels 22 and 24 are formed of a resilient material and preferably are a molded high impact ABS plastic. As with the clips 32, 32 the "memory" of the material is important since it develops a spring force in the outer wall when it is deflected laterally away from its normal molded or relaxed position as when a ski is held in the channel 30. For a given material and wall thickness, the radius of curvature of a curved wall portion 46 linking the wall portions 42 and 44 and the angle of inclination of the outer wall from the vertical determine to a large degree the retaining force exerted by the deflected outer wall 42 on the associated ski. It has been found that a force of at least five pounds per square foot is required to adequately secure the skis in the channels 30, 30. More specifically, for a panel formed of one-eighth inch thick high impact ABS plastic, an adequate retaining force is developed for skis of all conventional cross-sectional dimensions when the section 46 has a radius of curvature of one-eighth inch and the angle of inclination of the outer wall from the vertical is approximately fifteen degrees.

The skis 16, 16 are inserted in the panels 22, 24 by simply directing them downwardly into the channels 30, 30. The leading edge of each ski strikes the cam plate 30e and drives the outer wall 42 from its normal relaxed position (solid line position in FIG. 4) to a deflected position displaced laterally from the relaxed position. When the trailing edge of the ski clears the corner 30f, the outer wall returns partially toward its relaxed position until its inner surface bears on the outer upper edge of the skis (phantom position in FIG. 4). A significant advantage of this invention is that the panels can carry and restrain skis having different cross-sectional dimension. In particular, the panels are adapted to hold both ⅛ inch and ½ inch thick skis, 16' and 16", respectively, shown in phantom in FIG. 4.

By way of illustration but not of limitation, the panels 22 and 24 have a wall thickness of ⅛ inch and extend horizontally for approximately 8 inches. Each inner wall 40 have a height of 4 and ⅛ inches measured from the center of the hinge 38' to top surface of the bottom walls 44. Each bottom wall extends laterally for 1 inch. Each outer wall has a vertical height, measured from the upper surface of the bottom wall to the corner 30f of 2 and 15/16 inches when the outer wall is in its relaxed position with the corner spaced approximately ¼ inch from the inner wall. Each cam portion 30e extends approximately one-half inch measured in the cam portion along a perpendicular to the corner 30f.

A significant advantage of the carrier 12 is its low cost of manufacture. As mentioned above, the handle and panels are each molded as a single unit. The carrier is then assembled by axially aligning the hinges 38 and 38', inserting the hinge pin 26 and securing it with an acorn nut. Besides assembling the carrier, the pin 26 allows the panels 22, 24 to pivot from their back to back carrying position to a co-planar position shown in phantom in FIG. 4. In this position the skis 16 can be mounted in a common type of car ski rack (not shown) that accepts the skis in this position without removing them from the carrier. In a second common type of car ski rack, (not shown) the skis can be mounted in the car rack in the "carrying" position with the carrier in place on the skis.

There has been described an extremely simple, low cost carrier for skis and ski poles that accommodates skis of different cross-sectional dimensions and allows the skis to be mounted in both common forms of car racks without removing the carrier. The carrier is also extremely convenient to use, lightweight and durable.

While the invention has been described with reference to its preferred embodiments it will be understood that other variations are possible. For example, the panels can be formed of other resilient materials that exhibit a memory characteristic such as tempered steel. This material is, however, more costly and more difficult to fabricate. It is also contemplated that the skis can be secured in the channels 30 by auxiliary straps or clips that clamp the skis between outer wall 42 and the inner wall 40. Further, it is contemplated that many of the advantages of this invention can be obtained without the pivoting capability of the panels and therefore the handle can be secured to the panels in a rigid manner as by forming the handle and panels as a single piece or rigidly securing these members together. These and other modifications and variations will be apparent to those skilled in the art from the foregoing detailed description and the accompanying drawings. Such modifications and variations are intended to fall within the scope of the appended claims.

What is claimed and secured by Letters Patent is:

1. A hand held carrier for a pair of skis and a pair of ski poles comprising, handle means having a hand opening and having first hinge means formed on one edge that extends generally in said first direction, first and second panel means having second and third hinge means, respectively, formed on their upper edges that extend generally in said first direction, said first, second and third hinge means being mutually intermeshed and axially aligned along said first direction, a hinge pin pivotally engaging said first, second and third hinge means, said first and second panel means each including an inner wall, an outer wall and a bottom wall spanning said inner and outer walls that together define a ski-receiving channel, said walls being formed integrally of a resilient material having an inherent tendency to assume a relaxed position, said outer wall being deflected laterally away from a relaxed position proximate said inner wall when one of said skis is received in said channel to develop a gripping force on said one ski, and clip means formed integrally with said handle means of a resilient material for releasably engaging a pair of ski poles each extending generally in said first direction.

2. A carrier according to claim 1 wherein said resilient materials is acrylonitrile-butadiene-styrene plastic.

3. A carrier according to claim 2 wherein said first and second panel means are approximately one-eighth inch thick, said bottom and outer walls are joined in a curved section and said outer wall is inclined from the vertical towards said inner wall at an angle of approximately fifteen degrees.

4. A carrier according to claim 1 wherein said bottom wall extends laterally for approximately one inch.

5. A carrier according to claim 1 wherein said outer wall has an upper end portion inclined away from said inner wall.

6. A carrier according to claim 5 wherein said outer wall upper end portion lies above one of said skis seated in said channel.

7. A carrier according to claim 1 wherein said gripping force is at least five pounds per square foot.

* * * * *